Patented Aug. 14, 1923.

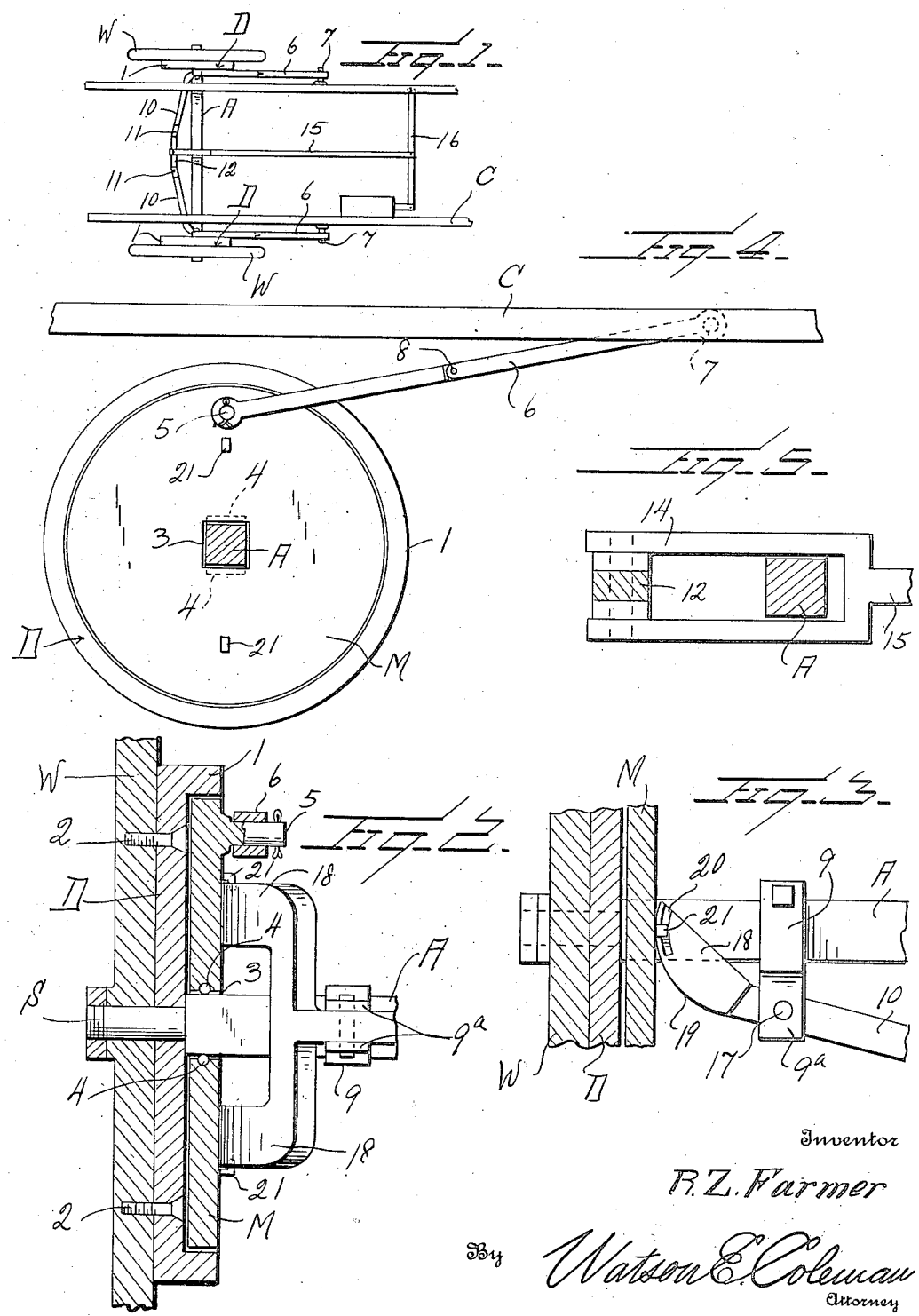

1,464,980

UNITED STATES PATENT OFFICE.

ROBERT Z. FARMER, OF ROSEBURG, OREGON, ASSIGNOR TO AUTOMATIC ELECTRIC BRAKE COMPANY, OF ROSEBURG, OREGON, A CORPORATION OF OREGON.

VEHICLE BRAKE.

Application filed June 7, 1920. Serial No. 387,099.

*To all whom it may concern:*

Be it known that I, ROBERT Z. FARMER, a citizen of the United States, residing at Roseburg, in the county of Douglas and State of Oregon, have invented certain new and useful Improvements in Vehicle Brakes, of which the following is a specification, reference being had to the accompanying drawings.

This invention relates to certain improvements in vehicle brakes and has relation more particularly to a device of this general character embodying two coacting disks, one being movable axially with respect to the other, and it is an object of the invention to provide a device of this general character with novel and improved means whereby the requisite relative movement may be imparted to one of the disks with respect to the other.

It is also an object of the invention to provide a novel and improved device of this general character embodying two disks, one movable axially with respect to the other, together with means whereby the axially movable disk is caused to travel in substantially a fixed path, with the possibility of the same binding on its support being substantially entirely eliminated.

Another object of the invention is to provide a novel and improved brake of this general character embodying two disks, one movable axially with respect to the other, together with operating means for the axially movable disk whereby the same may be caused to move in opposite directions as required.

The invention consists in the details of construction and in the combination and arrangement of the several parts of my improved vehicle brake whereby certain important advantages are attained and the device rendered simple, non-expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a diagrammatic view in top plan illustrating a brake mechanism constructed in accordance with an embodiment of my invention and in applied position.

Figure 2 is an enlarged fragmentary view partly in section and partly in elevation illustrating the brake mechanism constructed in accordance with an embodiment of my invention, said section being vertical.

Figure 3 is a fragmentary view partly in horizontal section and partly in top plan of the mechanism as illustrated in Figure 2.

Figure 4 is a fragmentary view partly in side elevation and partly in section illustrating the means for holding the axially movable disk against rotary movement, and Figure 5 is an enlarged fragmentary view partly in section and partly in elevation illustrating in detail a portion of the means for imparting movement to the axially movable disk.

As disclosed in the accompanying drawings, C denotes the chassis or frame of a vehicle with which coacts an axle A of a conventional type which, in the present embodiment of my invention, has its central portion angular in cross section with each of its extremities provided with a spindle S upon which is mounted a supporting wheel W.

Fixed to the inner face of each of the wheels W is a disk D, preferably of crucible steel, which has its marginal portion defined by an annular flange 1 extending inwardly of the axle A. The inner face of the disk D within the field defined by the flange 1 is plane. In the present embodiment of my invention, the disk D is held in applied position upon a wheel W by the anchoring screws 2 with the heads thereof flush with the inner face of the disk D, although it is to be understood that the disk D may be held in applied position in any manner which will comply with the requirements of practice.

M denotes a disk preferably of bronze provided at its center with an opening 3 of a configuration conforming to the cross sectional configuration of the angular portion of the axle A but slightly larger, so that said disk M may have axial movement longitudinally of the axle A. Mounted within the upper and lower edges of the opening 3 are the anti-friction members 4 herein disclosed as roller bearings which coact with the upper and lower portions of the axle A, whereby said disk M has axial movement lengthwise of the axle A with a minimum of frictional resistance.

The upper portion of the disk M has integrally formed therewith an outstanding pin 5 with which is operatively engaged an end portion of an articulated arm 6. The arm 6 in the present embodiment of my invention extends upwardly and forwardly with respect to the chassis or frame C and is secured as at 7 to the chassis or frame C at a desired point in advance of the axle A. A pivotal connection 8 between the sections comprised in the articulated arm 6 is such as to permit the sections of said arm to have relative swinging movement in a vertical direction but have no relative movement in a horizontal or transverse direction other than is permitted by the inherent resiliency possessed by the sections of said arm. The arm 6 serves to hold the disk M against rotary movement about its axis or more particularly with respect to the axle A so that said member M is prevented from binding upon the axle A so that at all times the disk M is positively maintained in a position to permit the same to have free and unobstructed movement in a direction lengthwise of the axle A. By having the arm 6 to prevent rotary movement of the disk M, positive means are provided to prevent turning strain upon the axle A and particularly when the disk or member M is brought into working contact with the disk D so that by the use of the arm 6 it is not necessary to employ any additional means for strengthening the springs comprised in the vehicle structure. The face of the member M contacting with the disk or member D is also plane.

In the present embodiment of my invention, it is desired that both of the disks or members M be axially moved in unison and of necessity in opposite directions and as herein embodied the axle A inwardly of the spindles S thereof and the disks or members M is provided with the rearwardly directed brackets 9, each of said brackets comprising a pair of vertically spaced ears 9ª. Pivotally supported between the ears 9ª of each of the brackets 9 is an end portion of a lever 10 extending inwardly and rearwardly and having its inner end portion operatively connected as at 11 with a connecting or tie rod 12, said rod 12 being common to both of the levers 10. Pivotally engaged with the central portion of the tie rod 12 is a yoke or fork 14 extending forwardly of the rod 12 and straddling the axle A, whereby said yoke or fork 14 is permitted to have sufficient endwise movement to rock the levers 10 as required.

The yoke or fork 14 is carried by an end portion of an elongated rigid member or bar 15 and as herein embodied and as particularly illustrated in Figure 1, the forward end portion of the bar 15 is operatively engaged with the fulcrum bar 16 adapted to be swung in any manner which best meets with the requirements of practice and preferably through the instrumentality of the operating mechanism particularly illustrated and described in my co-pending application filed June 7, 1920, Serial No. 387,100.

Each of the levers 10 outwardly of its pivotal connection 17 with the ears 9ª of the bracket 9 is provided with a fork having its arms 18 vertically spaced and preferably positioned above and below the axle A. The arms 18 have their outer margins formed into the cam faces 19 which have contact with the disk M at points above and below the axle A, so that upon movement of the bar 15 in one direction, each of the levers 10 will be swung in a manner to cause the cam faces 19 of the arms 18 to ride upon and contact with the adjacent faces of the disks or members M, whereby said disks or members M are axially moved into frictional engagement with the disks D whereby an effective braking action is obtained.

A side face of each of the arms 18 is provided adjacent the outer end of the cam face 19 with a cam slot 20 substantially conforming with the adjacent portion of the cam face 19 and fitting within said cam groove 20 is an angular lug 21 so that when the bar 15 is moved in a direction to effect a release, positive means thus being provided for moving each of the disks or members M out of contact with the adjacent disk D.

In practice, it is only necessary that the full extent of movement of the disks or members M be no more than one-eighth of an inch, although I do not wish to be understood as limiting myself in this respect as under certain conditions this extent of movement may, of necessity, have to be increased.

From the foregoing description it is thought to be obvious that a vehicle brake constructed in accordance with my invention is particularly well adapted for use by reason of the convenience and facility with which it may be assembled and operated, and it will also be obvious that my invention is susceptible of some change and modification without departnig from the principles and spirit thereof and for this reason I do not wish to be understood as limiting myself to the precise arrangement and formation of the several parts herein shown in carrying out my invention in practice except as hereinafter claimed.

I claim:

1. A braking mechanism including a rotating disk, an axially movable disk, said axially movable disk being non-rotative, and means for positively moving the axially movable disk by direct thrust in one direction and by pull in the opposite direction.

2. A braking mechanism comprising a rotary disk, an axially movable disk coacting therewith, a cam member supported adjacent the axially movable disk, means for operating said cam member, said cam member upon movement in one direction forcing the axially movable disk into contact with the rotary disk, and coacting means carried by the axially movable disk and the cam member for imparting movement to the axially movable disk away from the rotary disk upon movement of the cam member in the opposite direction.

3. A braking mechanism comprising a rotating disk, an axially movable disk coacting therewith, a cam member supported adjacent the axially movable disk and contacting therewith to move the same into frictional contact with the rotating disk upon movement of the cam member in one direction, and means for imparting movement to the cam member, said cam member and axially movable disk being provided with a coacting cam slot and lug for imparting movement to the axially movable disk away from the rotating disk upon movement of the cam member in the opposite direction.

4. In combination with a vehicle body, a supporting axle coacting therewith, and a wheel mounted upon the axle, of a disk secured to and rotating with the wheel, a disk mounted on the axle and having axial movement lengthwise of the axle toward or from the disk carried by the wheel, means for imparting axial movement to said second named disk, and an articulated member operatively engaged with the second named disk and the frame of the vehicle for holding said second named disk against rotary movement.

In testimony whereof I hereunto affix my signature.

ROBERT Z. FARMER.